Patented Oct. 9, 1945

2,386,259

UNITED STATES PATENT OFFICE 2,386,259

WATERPROOFING TREATMENT OF MATERIALS

Francis J. Norton, Schenectady, N. Y., assignor to General Electric Company, a corporation of New York No Drawing. Application July 30, 1942, Serial No. 452,885

14 Claims. (Cl. 117—121)

This invention relates broadly to the treatment of materials. More particularly it is concerned with the production of water-repellent materials by treating solid bodies which are normally water-non-repellent with the product obtained by hydrolysis of a methyldihalogenosilane of the formula $CH_3SiHX_2$ wherein X is a halogen atom, preferably a chlorine or bromine atom.

It has been known heretofore that silk, cotton, linen and other textile materials could be made resistant to water by coating the material with a water-repellent composition, for example rubber, metallic soaps, plasticized polyvinyl chloride, certain synthetic resins, etc. Articles waterproofed in this manner have not been entirely satisfactory for many applications, for example in the production of wearing apparel such as raincoats, sportswear, etc. Although resistant to penetration by water, the treated material is substantially nonporous and therefore does not permit the passage of moisture given off by the body of the wearer. As a result, waterproofed wearing apparel of this kind frequently is a source of discomfort to the wearer.

A rapid and economical method of treating materials to waterproof them is described in the copending applications of Winton I. Patnode, S. N. 365,983 (now Patent 2,306,222), filed November 16, 1940, and S. N. 433,327 filed March 4, 1942, both applications being assigned to the same assignee as the present invention. In accordance with the methods described therein, solid bodies which normally are wetted by water (that is, non-water-repellent bodies) are contacted with an organo-silicon halide (or mixture of organo-silicon halides) in vapor form or in the form of a solution in an inert solvent. The thus treated bodies are then brought into contact with vapors of an alkaline reagent, for example ammonia, or are washed with a solution of an alkali, such as sodium or potassium hydroxide, to neutralize any acidity that may be present after treatment of the bodies with the organo-silicon halide.

Although exceptionally water-repellent or waterproof products are obtained by the methods of waterproofing materials involving the use of organo-silicon halides, it has been difficult to maintain the original tensile strength of treated cloth, paper, and similar cellulosic materials due to the effect thereon of the hydrochloric or other halogen acid evolved when the organo-silicon halides react with the moisture or the hydroxyl groups of the cellulose or with the moisture of the air after treatment.

The present invention is based on my discovery that non-water-repellent bodies treated with the oily product obtained by hydrolyzing a methyldihalogenosilane, i. e. a methyl silicon dihalide, possess all the desirable water-repellent properties of the bodies treated with organo-silicon halides and in addition, in the case of cellulose materials, exhibit little or no loss in strength as a result of the waterproofing treatment.

The oily hydrolysis product may be prepared by any suitable method. For example the methyldihalogenosilane or a mixture of low-boiling methylhalogenosilanes consisting essentially of the monomethyldihalogenosilane may be dissolved in diethyl ether and then hydrolyzed by pouring the ether solution into a mixture of ice and water. After the oily product of hydrolysis has been thoroughly washed with water to remove all, or substantially all, of the acid products of hydrolysis such as hydrochloric acid, hydrobromic acid, etc., suitable waterproofing solutions thereof may be prepared by dissolving the oily product in an inert organic solvent such as toluene, carbon tetrachloride, benzene, ether, liquid aliphatic hydrocarbons, etc. Normally non-water-repellent bodies which have been treated with such solutions of the oily material, as by dipping, spraying, or otherwise contacting the body with the solutions and thereafter dried to remove the solvent, become water-repellent and this repellency is retained after washing with hot water, soap and water, dry-cleaning solvents, etc. A soft, velvety feel and in some cases a slight sheen is imparted to cloth, paper and the like treated in this manner. A further improvement in the water-repellency of the treated material is noted after the material has been aged. This ageing effect may be accelerated by heating the treated material for a short time at an elevated temperature. One hour at 100° C. is usually sufficient.

Small amounts of certain catalysts such as lead nitrate, lead, zinc and iron resinates, lead, zinc, or iron naphthenate, and various borates accelerate this ageing effect. Such catalysts, may be added to the treating solution or, alternatively, the cloth or other body to be made water-repellent may be impregnated or coated with a dilute solution of the catalyst prior, or subsequent, to the waterproofing treatment. The catalyst treated products can be aged at room temperatures. As the presence of oxygen appears to be necessary to obtain a satisfactory cure or ageing, the treated products should therefore be aged in contact with the air or other oxygen-containing atmosphere. In certain cases, the use of various oxidizing agents also may be found desirable.

In order that those skilled in the art better may understand how the present invention may be carried into effect, the following illustrative examples are given.

Example 1.—A piece of cotton cloth, specifically a piece of cotton gabardine twill, was dipped in a 4 per cent toluene solution of the acid-free or substantially acid-free hydrolysis product of methyl dichlorosilane. The solvent was evaporated and the treated product aged by heating for one hour at 100° C. The treated material was completely water-repellent. It could be scrubbed with soap and water and cleaned with dry cleaning solvents without losing its water-repellent characteristics. There was no visible coating on the cloth. In fact, the only change in the appearance thereof was that it had a slightly greater sheen than the untreated cloth. There was little, if any, measurable weakening of the cloth as a result of this treatment.

Example 2.—A piece of woolen fabric was substituted for the gabardine twill of Example 1. The treated product was found to be not only water-repellent but was also found to shrink less upon contact with water than did the untreated woolen fabric. The dyes in dyed woolen cloth treated in accordance with my invention run less when the material is washed than do the dyes of untreated woolen fabrics.

The above examples indicate the suitability of textile materials treated in accordance with this invention for the production of shower curtains, water-repellent wearing apparel, such as rain coats, sports jackets, etc. The treated fabrics not only possess the original porosity of the untreated materials but, in addition, are substantially as strong as they were prior to the treatment.

Example 3.—Paper which has been immersed in a dilute solution of the hydrolyzed methyldichlorosilane and thereafter dried also acquires the property of shedding water. Treated paper products of this type are particularly useful in the manufacture of wrapping paper, paper bags, and cardboard shipping containers, which may be exposed to water or to excessively humid atmospheric conditions.

Example 4.—A sample of sheet material prepared from colloidal bentonite not only became water-repellent, but was also made stronger by treatment with a 4 per cent toluene solution of the product of hydrolysis of methyldichlorosilane. Other organic and inorganic porous or nonporous non-water-repellent bodies which may be made more water-repellent by treatment with a hydrolyzed methyl silicon dichloride are ceramics, such as glass, porcelain, steatite; also silk, wood, and various metals. Electrical discharge devices having improved electrical characteristics made by treating them with hydrolyzed methyldihalogenosilanes are more specifically described and claimed in the copending application of Hubert E. Tanis, Jr., Serial No. 452,834, filed concurrently herewith and assigned to the same assignee as the present invention.

The concentration of the solutions of the hydrolysis product of methyldihalogenosilane which will satisfactorily waterproof a normally non-water-repellent body has been found to extend down to 0.5 per cent by weight based on the weight of the solution. The maximum concentration of the treating solution is in general determined by the properties desired in the treated product. Too high concentration of the solution may result in a stiffening of cloth or other fibrous sheet material treated therewith, although this result may be desirable for some purposes. Ordinarily dilute solutions containing less than 15 to 20 per cent of the oily hydrolysis product will produce satisfactory water-repellent characteristics in the treated material without unduly stiffening the material.

As has been previously mentioned, catalysts may be used to accelerate the aging effect noted in connection with the treated materials. For example, when a fraction of a per cent of lead nitrate was added to the treating solution of Example 1, the treated cotton had to be heated for only 15 minutes to obtain the maximum water-repellent characteristics. Certain metals and metal salts have been found to have an inhibitory effect in so far as the aging effect is concerned. For example, cobalt salts increase the time necessary to age completely the treated material. In this connection ordinary commercial fabrics may or may not contain metallic compounds which will have either an accelerating or an inhibiting effect on the aging of the treating solution. When the cloth is found to contain an inhibitor, such substance can ordinarily be removed by merely washing the cloth in hot water prior to the waterproofing treatment.

What I claim as new and desire to secure by Letters Patent of the United States, is:

1. The process of waterproofing a normally non-water-repellent material which comprises treating said material with the oily product obtained by hydrolyzing a methyldihalogenosilane of the formula $CH_3SiHX_2$ wherein X represents a halogen selected from the group consisting of chlorine and bromine.

2. The process of waterproofing a normally non-water-repellent material which comprises contacting said material with a solution of a hydrolyzed methyldihalogenosilane of the formula $CH_3SiHX_2$ wherein X represents a halogen selected from the group consisting of chlorine and bromine.

3. The process of waterproofing a normally non-water-repellent material which comprises treating said material with a solution consisting of an inert organic solvent and from 0.5 to 20 per cent by weight of the oily product obtained by hydrolyzing a methyldihalogenosilane of the formula $CH_3SiHX_2$ wherein X represents a halogen selected from the group consisting of chlorine and bromine and washing the hydrolysis product to remove substantially all of the acid products of hydrolysis, and thereafter aging the treated material.

4. The process of treating a normally non-water-repellent body which comprises treating said body with the acid-free oily hydrolysis product obtained by hydrolyzing methyldichlorosilane.

5. The process of producing a strong waterproofed fibrous material which comprises treating said fibrous material with a composition comprising the acid-free hydrolysis product of a methyldihalogenosilane of the formula $CH_3SiHX_2$ wherein X represents a halogen selected from the group consisting of chlorine and bromine.

6. The process of treating cellulosic materials which comprises contacting said materials with the oily product obtained by hydrolyzing a methyldihalogenosilane of the formula $CH_3SiHX_2$ wherein X represents a halogen selected from the group consisting of chlorine and bromine.

7. The process of waterproofing a material composed of cellulosic fibers which comprises contacting said material with the acid-free products of hydrolysis of a methyldihalogenosilane of the formula $CH_3SiHX_2$ wherein X represents a halogen selected from the group consisting of chlorine and bromine.

8. The process of claim 7 wherein the methyldihalogenosilane is methyldichlorosilane.

9. A normally non-water-repellent body which has been treated with the oily product of hydrolysis of a methyldihalogenosilane of the formula $CH_3SiHX_2$ wherein X represents a halogen selected from the group consisting of chlorine and bromine.

10. Organic fibrous materials which have been treated with the oily product obtained by hydrolyzing a methyldihalogenosilane of the formula $CH_3SiHX_2$ wherein X represents a halogen selected from the group consisting of chlorine and bromine.

11. Cotton cloth which has been treated with a dilute solution of the oily product obtained by hydrolyzing methyldichlorosilane.

12. A normally non-water-repellent body which has been coated with a substantially invisible baked film of the oily product of hydrolysis of a methyldihalogenosilane of the formula $CH_3SiHX_2$ wherein X represents a halogen selected from the group consisting of chlorine and bromine.

13. A sheet of colloidal bentonite which has been treated with the oily product of hydrolysis of a methyldihalogenosilane of the formula $CH_3SiHX_2$ wherein X represents a halogen selected from the group consisting of chlorine and bromine.

14. Paper which has been treated with the acid-free oily product obtained by hydrolyzing methyldichlorosilane and washing the hydrolysis product substantially to remove the acid products of hydrolysis.

FRANCIS J. NORTON.